United States Patent [19]

Lavely

[11] Patent Number: 4,693,342
[45] Date of Patent: Sep. 15, 1987

[54] ROD ACTUATOR FOR AUTOMATIC SLACK ADJUSTING MECHANISMS

[75] Inventor: Daniel Lavely, Mt. Clemens, Mich.

[73] Assignee: Rockwell International Corporation, Pittsburgh, Pa.

[21] Appl. No.: 734,530

[22] Filed: May 16, 1985

[51] Int. Cl.$^4$ ............................................. F16D 65/46
[52] U.S. Cl. .................. 188/79.5 K; 74/522; 403/379
[58] Field of Search .................. 188/79.5 K, 79.5 GE, 188/196 V; 403/379, 378, 265; 74/579, 522

[56] References Cited

U.S. PATENT DOCUMENTS

| | | | |
|---|---|---|---|
| 777,411 | 12/1904 | Hall | 403/379 |
| 922,263 | 5/1909 | Cole | 403/319 |
| 2,752,009 | 6/1956 | MacDougall | 74/522 |
| 3,949,840 | 4/1976 | Cumming et al. | 188/79.5 K |
| 4,015,692 | 4/1977 | Mathews | 188/79.5 K |
| 4,256,208 | 3/1981 | Najer et al. | 188/79.5 K |

*Primary Examiner*—George E. A. Halvosa
*Assistant Examiner*—Matthew C. Graham

[57] ABSTRACT

A rod actuator for an automatic slack adjusting mechanism having a flexible boot seal provided with an enlarged lip, the actuator including a slotted cylindrical-shaped jacket member and a flat rod member disposed within the slot of the jacket member for registration therewith.

8 Claims, 7 Drawing Figures

U.S. Patent  Sep. 15, 1987  Sheet 2 of 2  4,693,342

ROD ACTUATOR FOR AUTOMATIC SLACK ADJUSTING MECHANISMS

BACKGROUND OF THE INVENTION

1. Field of the Invention

This invention is directed to rod actuators used in automatic slack adjusting mechanisms for cam actuated brake assemblies and, more specifically, to a multi-piece, multi-material rod actuator.

2. Description of the Prior Art

Various types of automatic slack adjusters are used on conventional cam brake systems. In each, some type of rod member is used to translate movement of the slack adjuster into incremental adjustments or take-ups in the brake shoes. Generally, these rod members are of a one-piece construction that requires special machining of its end sections for connection of the rod member to the automatic slack adjuster at one end, and a piston rod or clevis at the other end thereof. Such machining necessarily requires additional time and fabrication, as well as loss of material, a situation which results in increased costs.

SUMMARY OF THE INVENTION

The present invention avoids the shortcomings and overcomes the disadvantages of known rod actuators by providing for a two-piece rod actuator. The first piece or rod member is preferably formed by punching steel plate of stock thickness. As a result, the fabrication of the rod member requires less time, forming effort and waste. The second piece of jacket member is configured to slide onto the rod member and reinforce same. The jacket member is made of plastic material, preferably some form of crystalline thermoplastic polymer. The jacket member may also be bonded directly to the rod member.

An object of the invention is to provide a rod actuator for an automatic slack adjuster comprising a first member with a first hole passing therethrough at a first end and a second hole passing therethrough at a second end thereof, and a jacket member having an axially extending slot therethrough for registration therein of the first end of the first member. The jacket member further includes an opening passing therethrough, the opening being located in the jacket member such that when the first end of the first member is registered within the slot, the first hole is aligned with the opening in the jacket member.

In a preferred embodiment, the first member is in the form of a flat steel bar. The jacket member comprises a crystalline thermplastic polymer. Furthermore, the rod actuator includes a stopping means to prevent the first member from passing completely through the jacket member. In this embodiment, the stopping means also includes at least one laterally extending ear at the first end of the first member, the ear having a forward facing shoulder that abuts a complementing rearward facing shoulder of the slot. Additionally, in the preferred embodiment of the invention, the jacket member is substantially cylindrical in shape with a conically tapered end extending towards the second end of the first member and an opposite flat end. The jacket member also includes a circumferential groove located between the flat end and the tapered end thereof for receipt of an enlarged lip carried by a flexible boot seal of a slack adjuster mechanism.

Other objects and advantages of the invention shall become apparent from the following detailed description thereof when taken in conjunction with the drawings wherein like reference characters refer to corresponding parts in the several views.

DETAILED DESCRIPTION OF THE PREFERRED EMBODIMENT

Figure 1:
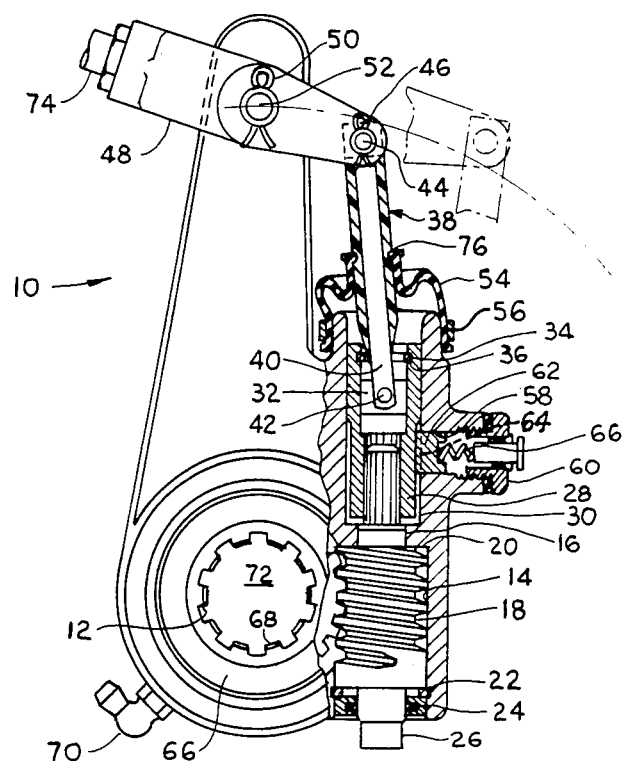
FIG. 1 is a side elevational view of a preferred embodiment of a rod actuator according to the present invention shown incorporated in an automatic slack adjusting mechanism, with a portion of the mechanism housing being broken away from clarity of illustration.

FIG. 1 shows a rod actuator according to a preferred embodiment of the invention as incorporated in combination with an automatic slack adjusting mechanism. A lever 10 comprises an elongated housing having an opening 12 adjacent one end thereof and a bore 14 extending partially along the length of the housing. A shaft 16 having a worm 18 formed integrally therewith is rotatably mounted in the bar between a shoulder 20 and a snap ring 22. A seal 24 is provided axially outwardly of snap ring 22, and the internal surfaces of seal 24 and shoulder 20 serve to provide radial bearing surfaces for shaft 16. The end of shaft 16 disposed axially outwardly of worm 18 is configured in the form of a square driving head 26 which provides an externally accessible means for manually rotating shaft 16. The opposite end of shaft 16 extending beyond shoulder 20 includes a longitudinally movable rotary driving splined connection internally of a plunger 28 provided in the form of a hollow cylinder. The external surface portion of plunger 28 concentric with its interior splined connection to shaft 16 is provided with a plurality of circumferentially spaced and axially extending helical teeth 30.

A piston 32 is freely slidably disposed within the interior of plunger 28. The hollow interior of plunger 28 is provided with a circumferentially extending groove 34 axially outwardly of piston 32. A retaining ring 36 is fitted to groove 34 to prevent piston 32 from being withdrawn from plunger 28, and to provide a piston-engaging abutment for moving plunger 28 axially outwardly of bore 14 in response to axially outward movement of piston 32 beyond a predetermined distance.

Piston 32 is diametrically slotted to receive the flat end 40 of a rod actuator 38 that is pivotally connected to piston 32 by a pin 42. The opposite end of rod actuator 38 is pivotally connected by means of a pin 44 and a cotter key 46 to the bifurcated end of a clevis 48. The opposite end of clevis 48 is provided with an internally threaded bore which receives the threaded end of a brake actuation rod 74. The end of lever 10 opposite opening 12 extends between the length of the bifurcated end of clevis 48 where it is pivotally connected intermediate the ends of clevis 48 by means of a cotter key 50 and a pin 52 passing through an appropriate sized hole provided in lever 10.

As also shown in FIG. 1, the end of bore 14 receiving rod actuator 38 is closed by means of a flexible boot seal 54 that is elastically snugly engaged about actuator rod 38 and secured by retaining clamp 56 to a boss-like projection in lever 10.

Lever 10 is also provided with a bore 58 which intersects bore 14 opposite helical-toothed portion 30 of plunger 28. The outer end of bore 58 is internally threaded to receive a hollow cap screw 60. A pawl 62 provided with buttressed teeth 64 formed at one end thereof is slidably received within bore 58. A spring 66 is seated against the hollow interior of cap screw 60 and biases buttressed teeth 64 of pawl 62 into toothed engagement with helical teeth 30 carried by plunger 28.

A worm gear 66 having a splined internal opening 68 is mounted for rotation in lever 12. A fitting 60 is provided to introduce lubricant between worm gear 66 and opening 12. The teeth of worm 18 drivingly engage the teeth of worm gear 66. Rotary movement of shaft 16 and worm 18 in bore 14 serve to rotate worm gear 66 and a cam shaft 72 relative to lever 10 since worm 18 is fixed by shoulder 20 and snap ring 22 against axial movement within bore 14. Worm 18 functions as a stationary part of lever 10 and rotates worm gear 66 and cam shaft 72 when lever 10 is pivoted about the axis of cam shaft 72 by actuation rod 74 and clevis 48.

Automatic slack adjustment is effected by operation of shaft 16, worm 18, plunger 28, piston 32, rod actuator 38 and clevis 48 pivotally connected to piston 32 of lever 10. Axial movement of actuation rod 74 in a brake applied direction serves to move clevis 48 and lever 10 clockwise about the axis of cam shaft 72. During such movement, clevis 48 traverses an arcuate path, as shown by the dotted line in FIG. 1, and pivotal movement about pin 52 serves to move rod actuator 38 and piston 32 outwardly relative to plunger 28 and bore 14, as shown by the phantom lines in FIG. 1.

The spacing provided between piston 32 and retaining ring 36 permits piston 32 to move freely within an axial length of plunger 28. This spacing is calculated relative to the arcuate movement of cam shaft 72, which movement is required to take up the normal running clearance desired between the brake lining (not shown) and the brake drum (not shown) of an associated brake assembly. Additional arcuate movement producing distortion in the brake assembly and the lining where permitted before automatic adjustments are to be effected are combined by the axial length of buttressed teeth 64 as long as the brake linings have not experienced appreciable wear. Piston 32 will abut ring 36 and move plunger 28 outwardly relative to bore 14 and buttressed teeth 64. After the acceptable amount of lining wear, plunger 28 moving relative to the spring by pawl 62 will cause pawl 62 to retract and engage an adjacent set of helical teeth 30 on plunger 28 after the brakes are released and lever 10 and plunger 28 are returned to their normal position, as shown in FIG. 1. Buttressed teeth 64 of pawl 62 shall rotate plunger 28, shaft 16 and worm 18 to effect a predetermined arcuate movement of worm gear 66 and cam shaft 72. This will produce a slight rotary adjustment to an actuating cam (not shown) to pivot the brake shoe (not shown) outwardly until the desired running clearance is again established between the linings and the brake drum.

Figure 2:
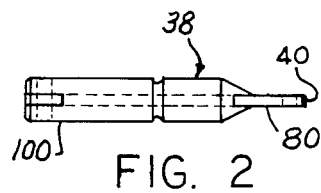
FIG. 2 is a side elevational view of the rod actuator shown in FIG. 1.
Figure 3:
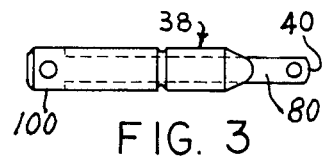
FIG. 3 is a top view of the rod actuator shown in FIG. 2.
Figure 4:
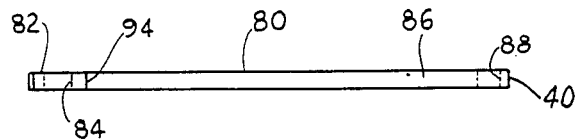
FIG. 4 is a side elevational view of a rod member forming part of the rod actuator.
Figure 5:
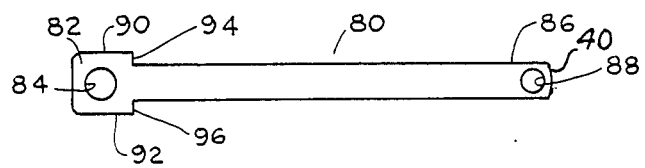
FIG. 5 is a top view of the rod member shown in FIG. 4.

Rod actuator 38 shall now be described in detail with reference to FIGS. 2-7. As shown in FIGS. 2 and 3, rod actuator 38 is comprised of two components, a rod member 80 and a jacket member 100. Rod member 80 is in the form of a flat bar which, as shown in FIGS. 4 and 5, includes a headed end 82 provided with a hole 84 through which can be inserted pin 44 for connection of rod actuator 38 to clevis 48. An opposite end 86 of rod member 80 is provided with a hole 88 which permits the connection of end 86 to piston 32 by pin 42. Rod member 88 is generally a steel plate of stock thickness and is preferably formed by punching. Rod member 80 can also be treated to prevent or retard corrosion of its surfaces which are exposed to high humidity under critical environment conditions.

Figure 6:
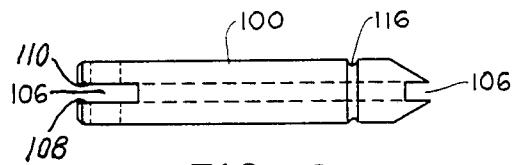
FIG. 6 is a side elevational view of a jacket member forming part of the rod actuator.
Figure 7:
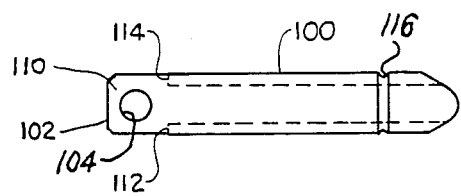
FIG. 7 is a top view of the jacket member shown in FIG. 6.

As particularly shown in FIGS. 6 and 7, jacket member 100 is preferably of a generally cylindrical configuration. Jacket member 100 can be formed from a variety of materials, preferably plastic and specifically including crystalline thermoplastic polymers providing high mechanical strength, rigidity and toughness. An end 102 of jacket member 100 includes a hole 104 which, when rod actuator 38 is assembled, is aligned with hole 84 of rod member 80. Jacket member 100 further includes a slot 106 which passes completely therethrough along its longitudinal axis and is disposed perpendicular to the axis of hole 104. The width and thickness of slot 106 is such as to permit rod member 80 to be slid within slot 106. To prevent rod member 80 from being able to pass completely through jacket member 100 through slot 106, headed end 82 of rod member 80 is provided with a pair of opposed ear sections 90 and 92 that are received within a pair of complementing expanded slot sections 108 and 110 of jacket member 100. Ear sections 90 and 92 are provided with a pair of corresponding faces 94 and 96 which abut a pair of faces 112 and 114 provided in jacket member 100 thereby preventing rod member 80 from passing completely through slot 106 of jacket member 100.

Jacket member 100 further includes a circumferential groove 116. As shown in FIG. 1, groove 116 serves to receive enlarged lip 76 of flexible boot seal 54 so that the latter is snugly engaged about rod actuator 38.

The foregoing describes a preferred embodiment of a rod actuator according to the invention for use in conjunction with an automatic slack adjusting mechanism, but may also be embodied in other specific forms without departing from the spirit or central characteristics of the invention. Accordingly, the invention is not to be limited to the specific embodiment illustrated and described herein, and the true scope and spirit of the invention are to be determined by reference to the appended claims.

I claim:

1. A rod actuator for connecting between a clevis mounted on the end of an actuating rod connected to an actuating lever and a slotted piston in a threaded plunger that adjusts slack in an automatic slack adjusting mechanism having a lever, an actuating rod connected to the lever to move the lever, a clevis attached to the actuating rod, a shaft connected to the lever, a threaded plunger connected to the shaft, a piston mounted for limited movement in the plunger, and an adjusting worm connected to the plunger and an adjusting gear connected to the worm and to the lever, a flexible boot seal provided with an enlarged lip, which actuator comprises an elongate rod member having a first hole therethrough at a first end thereof for attaching to the clevis, and a second hole therethrough at a second end thereof, for attaching to the piston, an elongate jacket member having a longitudinally extending cavity therethrough for receiving the rod member therein and registration of the first end of the rod member, the jacket member including an opening therethrough and positioned such that when the first end of the rod member is registered within the cavity, the first hole is aligned with the opening and a pin passing through the clevis, the first hole and the opening for attaching the rod actuator to the clevis and holding the rod member and the jacket member assembled together.

2. The rod actuator of claim 1 wherein the rod member is in the form of a flat bar and the cavity is in the form of a slot which extends completely through the jacket member.

3. The rod actuator of claim 2 further including a stopping means for preventing the rod member from passing completely through the jacket member.

4. The rod actuator of claim 3 wherein the stopping means includes at least one laterally extending ear section carried by the first end of the rod member and a complementing face formed in the jacket member for engagement by the ear section.

5. The rod actuator of claim 4 wherein the stopping means includes a pair of laterally extending ear sections and a pair of complementing faces.

6. The rod actuator of claim 1 wherein the rod member is formed of steel and the jacket member is formed of a crystalline thermoplastic polymer.

7. The rod actuator of claim 1 wherein the jacket member is cylindrical in configuration and includes a conically tapered first end extending towards the second end of the rod member when the rod member is received within the cavity, and a flat second end for registration with the first end of the rod member.

8. The rod actuator of claim 7 wherein the jacket member includes a circumferential groove disposed between the first and second ends for engagement by the enlarged lip of the flexible boot seal.

* * * * *